US010311365B2

(12) United States Patent
Ruffner et al.

(10) Patent No.: US 10,311,365 B2
(45) Date of Patent: *Jun. 4, 2019

(54) METHODS AND SYSTEMS FOR RECOMMENDING A CONTEXT BASED ON CONTENT INTERACTION

(71) Applicant: Microsoft Technology Licensing, LLC, Redmond, WA (US)

(72) Inventors: Jennifer Granito Ruffner, San Francisco, CA (US); Allen J. Blue, Sunnyvale, CA (US); Sarah Jean Culberson Alpern, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

This patent is subject to a terminal disclaimer.

(21) Appl. No.: 15/005,963

(22) Filed: Jan. 25, 2016

(65) Prior Publication Data
US 2016/0155059 A1 Jun. 2, 2016

Related U.S. Application Data

(63) Continuation of application No. 13/853,020, filed on Mar. 28, 2013, now Pat. No. 9,247,015, which is a continuation of application No. 13/010,681, filed on Jan. 20, 2011, now Pat. No. 9,172,762.

(51) Int. Cl.
| G06F 15/173 | (2006.01) |
| G06N 5/04 | (2006.01) |
| G06F 16/954 | (2019.01) |
| G06F 17/30 | (2006.01) |
| G06Q 30/02 | (2012.01) |

(Continued)

(52) U.S. Cl.
CPC .......... *G06N 5/048* (2013.01); *G06F 16/954* (2019.01); *G06F 17/30873* (2013.01); *G06Q 30/0201* (2013.01); *G06Q 50/01* (2013.01); *H04L 67/22* (2013.01)

(58) Field of Classification Search
None
See application file for complete search history.

(56) References Cited

U.S. PATENT DOCUMENTS

| 6,253,202 B1 | 6/2001 | Gilmour |
| 6,981,040 B1 | 12/2005 | Konig et al. |
| 7,720,720 B1 | 5/2010 | Sharma et al. |

(Continued)

OTHER PUBLICATIONS

"U.S. Appl. No. 14/565,963 Response filed Aug. 25, 2016 to Non Final Office Action dated Jun. 23, 2016", 12 pgs.

(Continued)

*Primary Examiner* — Mohamed Ibrahim
(74) *Attorney, Agent, or Firm* — Schwegman Lundberg & Woessner, P.A.

(57) ABSTRACT

The present disclosure relates to methods and systems for recommending a context to a user of a social network service, based on detecting an interaction with some item of web content. With some embodiments, after detecting an interaction with a web document, a topic to which the web document is related is determined. A context, such as an online or offline forum, known to be associated with the topic is then identified. Finally, the identified context is presented to the user as a recommendation for a content source that is likely to be of interest to the user.

19 Claims, 8 Drawing Sheets

CONNECTIONS 12

COMPANY 14

USER 10

PUBLIC/PRIVATE GROUPS 16

TOPIC (e.g., PROFESSIONAL INTEREST CENTER) 18

(51) Int. Cl.
  *G06Q 50/00* (2012.01)
  *H04L 29/08* (2006.01)

(56) References Cited

U.S. PATENT DOCUMENTS

| | | | |
|---|---|---|---|
| 7,925,743 | B2 | 4/2011 | Neely et al. |
| 7,984,056 | B1 | 7/2011 | Kane |
| 8,060,405 | B1 | 11/2011 | Lawrence |
| 8,090,794 | B1 | 1/2012 | Kilat et al. |
| 8,306,922 | B1 | 11/2012 | Kunal et al. |
| 8,307,066 | B2 | 11/2012 | Carter et al. |
| 8,402,023 | B2 | 3/2013 | Sheehan et al. |
| 8,468,143 | B1 | 6/2013 | Oztekin et al. |
| 8,489,586 | B2 | 7/2013 | Korte et al. |
| 8,554,742 | B2 | 10/2013 | Naeymi-Rad et al. |
| 8,949,239 | B2 | 2/2015 | Ruffner et al. |
| 9,229,900 | B2 | 1/2016 | Blue et al. |
| 9,247,015 | B2 | 1/2016 | Ruffner et al. |
| 9,633,116 | B2 | 4/2017 | Korte et al. |
| 9,674,136 | B2 | 6/2017 | Blue et al. |
| 2006/0004713 | A1 | 1/2006 | Korte et al. |
| 2006/0042483 | A1 | 3/2006 | Work et al. |
| 2006/0200434 | A1 | 9/2006 | Flinn et al. |
| 2006/0224675 | A1 | 10/2006 | Fox et al. |
| 2007/0118802 | A1 | 5/2007 | Gerace et al. |
| 2007/0156636 | A1 | 7/2007 | Norton et al. |
| 2007/0198506 | A1 | 8/2007 | Attaran Rezaei et al. |
| 2007/0203996 | A1 | 8/2007 | Davitz et al. |
| 2007/0208719 | A1 | 9/2007 | Tran |
| 2007/0260520 | A1 | 11/2007 | Jha et al. |
| 2008/0024520 | A1 | 1/2008 | Rudd |
| 2008/0077574 | A1 | 3/2008 | Gross |
| 2008/0177834 | A1 | 7/2008 | Gruhl et al. |
| 2008/0209351 | A1 | 8/2008 | Macadaan et al. |
| 2009/0070219 | A1 | 3/2009 | D'Angelo et al. |
| 2009/0070325 | A1 | 3/2009 | Gabriel et al. |
| 2009/0086720 | A1 | 4/2009 | Westlake |
| 2009/0094233 | A1 | 4/2009 | Marvit et al. |
| 2009/0234876 | A1 | 9/2009 | Schigel et al. |
| 2009/0307129 | A1 | 12/2009 | Matkowsky et al. |
| 2009/0319288 | A1 | 12/2009 | Slaney et al. |
| 2009/0327232 | A1 | 12/2009 | Carter et al. |
| 2010/0049534 | A1 | 2/2010 | Whitnah et al. |
| 2010/0205541 | A1 | 8/2010 | Rapaport et al. |
| 2010/0262658 | A1 | 10/2010 | Mesnage |
| 2010/0268720 | A1 | 10/2010 | Spivack et al. |
| 2010/0312644 | A1 | 12/2010 | Borgs et al. |
| 2010/0324990 | A1 | 12/2010 | D'angelo et al. |
| 2011/0004831 | A1 | 1/2011 | Steinberg et al. |
| 2011/0016121 | A1 | 1/2011 | Sambrani et al. |
| 2011/0066615 | A1 | 3/2011 | Pradhan et al. |
| 2011/0154223 | A1 | 6/2011 | Whitnah et al. |
| 2011/0167054 | A1 | 7/2011 | Bailey et al. |
| 2011/0191311 | A1 | 8/2011 | Polonsky et al. |
| 2011/0289011 | A1 | 11/2011 | Hull et al. |
| 2012/0059822 | A1 | 3/2012 | Malandain et al. |
| 2012/0079023 | A1 | 3/2012 | Tejada-gamero et al. |
| 2012/0084160 | A1 | 4/2012 | Badros et al. |
| 2012/0109830 | A1 | 5/2012 | Vogel |
| 2012/0110096 | A1 | 5/2012 | Smarr et al. |
| 2012/0166530 | A1 | 6/2012 | Tseng |
| 2012/0166532 | A1 | 6/2012 | Juan et al. |
| 2012/0179958 | A1 | 7/2012 | Tarjan |
| 2012/0191715 | A1 | 7/2012 | Ruffner et al. |
| 2012/0191776 | A1 | 7/2012 | Ruffner et al. |
| 2013/0066711 | A1 | 3/2013 | Liyanage et al. |
| 2013/0227020 | A1 | 8/2013 | Ruffner et al. |
| 2013/0263020 | A1 | 10/2013 | Heiferman et al. |
| 2013/0304731 | A1 | 11/2013 | Zheng et al. |
| 2014/0019882 | A1 | 1/2014 | Chew et al. |
| 2014/0129463 | A1 | 5/2014 | Grayevsky |
| 2014/0143228 | A1 | 5/2014 | Blue et al. |
| 2015/0088877 | A1 | 3/2015 | Ruffner et al. |
| 2016/0112365 | A1 | 4/2016 | Blue et al. |

OTHER PUBLICATIONS

"U.S. Appl. No. 14/565,963, Examiner Interview Summary dated Jan. 23, 2017", 3 pgs.
"U.S. Appl. No. 14/565,963, Final Office Action dated Nov. 9, 2016", 12 pgs.
"U.S. Appl. No. 14/565,963, Pre-Appeal Brief filed Feb. 6, 2017", 5 pgs.
"U.S. Appl. No. 14/967,030, Examiner Interview Summary dated Sep. 13, 2016", 3 pgs.
"U.S. Appl. No. 14/967,030, Examiner Interview Summary dated Nov. 25, 2016", 3 pgs.
"U.S. Appl. No. 14/967,030, Non Final Office Action dated Sep. 30, 2016", 18 pgs.
"U.S. Appl. No. 14/967,030, Notice of Allowance dated Feb. 8, 2017", 17 pgs.
"U.S. Appl. No. 14/967,030, Response filed Sep. 8, 2016 to Final Office Action dated Aug. 10, 2016", 11 pgs.
"U.S. Appl. No. 14/967,030, Response filed Dec. 20, 2016 to Non Final Office Action dated Sep. 30, 2016", 10 pgs.
"U.S. Appl. No. 14/565,963, Examiner Interview Summary dated Aug. 2, 2016", 3 pgs.
"U.S. Appl. No. 14/565,963, Non Final Office Action dated Jun. 23, 2016", 13 pgs.
"U.S. Appl. No. 14/565,963, Third Party Submission Under 37 CFR 1.290 dated Jul. 10, 2015", 2 pgs.
"U.S. Appl. No. 14/967,030, Examiner Interview Summary dated Jun. 27, 2016", 3 pgs.
"U.S. Appl. No. 14/967,030, Final Office Action dated Aug. 10, 2016", 18 pgs.
"U.S. Appl. No. 14/967,030, Non Final Office Action dated May 5, 2016", 18 pgs.
"U.S. Appl. No. 14/967,030, Response filed Jul. 19, 2016 to Non Final Office Action dated May 5, 2016", 12 pgs.
U.S. Appl. No. 13/010,663, U.S. Pat. No. 8,949,239, filed Jan. 20, 2011, Methods and Systems For Utilizing Activity Data With Clustered Events.
U.S. Appl. No. 14/565,963, filed Dec. 10, 2014, Methods and Systems For Utilizing Activity Data With Clustered Events.
U.S. Appl. No. 13/010,681, U.S. Pat. No. 9,172,762, filed Jan. 20, 2011, Methods and Systems For Recommending a Context Based on Content Interaction.
U.S. Appl. No. 13/853,020, U.S. Pat. No. 9,247,015, filed Mar. 28, 2013, Methods and Systems For Recommending a Context Based on Content Interaction.
U.S. Appl. No. 14/967,030, filed Dec. 11, 2015, Techniques For Ascribing Social Attributes to Content.
U.S. Appl. No. 14/085,402, U.S. Pat. No. 9,229,900, filed Nov. 20, 2013, Techniques For Ascribing Social Attributes to Content.
U.S. Appl. No. 15/486,492, filed Apr. 13, 2017, Techniques For Ascribing Social Attributes to Content.
"Non Final Office Action Issued in U.S. Appl. No. 15/486,492", dated Jun. 26, 2018, 17 Pages.
"Final Office Action Issued in U.S. Appl. No. 15/486,492", dated Sep. 18, 2018, 16 Pages.
"Final Office Action Issued in U.S. Appl. No. 13/303,812", dated Jun. 19, 2014, 26 Pages.
"Final Office Action Issued in U.S. Appl. No. 13/303,812", dated Jun. 14, 2016, 63 Pages.
"Non Final Office Action Issued in U.S. Appl. No. 13/303,812", dated Feb. 14, 2014, 24 Pages.
"Non Final Office Action Issued in U.S. Appl. No. 13/303,812", dated Feb. 25, 2016, 42 Pages.
"Final Office Action Issued in U.S. Appl. No. 14/592,810", dated Feb. 24, 2016, 24 Pages.
"Non Final Office Action Issued in U.S. Appl. No. 14/592,810", dated Apr. 2, 2015, 44 Pages.
"U.S. Appl. No. 13/010,663, Response filed Aug. 13, 2013 to Final Office Action dated Jun. 13, 2013", 12 pgs.
"U.S. Appl. No. 13/010,663, Response filed Dec. 13, 2013 to Final Office Action dated Jun. 13, 2013", 14 pgs.
"U.S. Appl. No. 13/010,663, Advisory Action dated Aug. 22, 2013", 3 pgs.

(56) References Cited

OTHER PUBLICATIONS

"U.S. Appl. No. 13/010,663, Final Office Action dated Jun. 13, 2013", 11 pgs.
"U.S. Appl. No. 13/010,663, Non Final Office Action dated Feb. 22, 2013", 10 pgs.
"U.S. Appl. No. 13/010,663, Non Final Office Action dated Feb. 26, 2014", 11 pgs.
"U.S. Appl. No. 13/010,663, Non Final Office Action dated Jul. 11, 2012", 11 pgs.
"U.S. Appl. No. 13/010,663, Notice of Allowance dated Sep. 29, 2014", 8 pgs.
"U.S. Appl. No. 13/010,663, Response filed Jan. 11, 2013 to Non Final Office Action dated Jul. 11, 2012", 12 pgs.
"U.S. Appl. No. 13/010,663, Response filed Apr. 24, 2013 to Non Final Office Action dated Feb. 22, 2013", 11 pgs.
"U.S. Appl. No. 13/010,663, Response filed Jul. 28, 2014 to Non Final Office Action dated Feb. 26, 2014", 14 pgs.
"U.S. Appl. No. 13/010,681, Examiner Interview Summary dated Feb. 12, 2015", 3 pgs.
"U.S. Appl. No. 13/010,681, Final Office Action dated Mar. 14, 2014", 17 pgs.
"U.S. Appl. No. 13/010,681, Non Final Office Action dated Jul. 31, 2013", 16 pgs.
"U.S. Appl. No. 13/010,681, Non Final Office Action dated Oct. 23, 2014", 20 pgs.
"U.S. Appl. No. 13/010,681, Notice of Allowance dated Jun. 17, 2015", 7 pgs.
"U.S. Appl. No. 13/010,681, Response filed Feb. 23, 2015 to Non-Final Office Action dated Oct. 23, 2014", 11 pgs.
"U.S. Appl. No. 13/010,681, Response dated Dec. 31, 2013 to Non Final Office Action filed Jul. 31, 2013", 11 pgs.
"U.S. Appl. No. 13/010,681. Response filed Aug. 14, 2014 to Final Office Action dated Mar. 14, 2014.", 11 pgs.
"U.S. Appl. No. 13/853,020, Final Office Action dated May 20, 2015", 13 pgs.
"U.S. Appl. No. 13/853,020, Non Final Office Action dated Oct. 24, 2014", 12 pgs.
"U.S. Appl. No. 13/853,020, Notice of Allowance dated Sep. 18, 2015", 8 pgs.
"U.S. Appl. No. 13/853,020, Response filed Jan. 26, 2015 to Non Final Office Action dated Oct. 24, 2014", 13 pgs.
"U.S. Appl. No. 13/853,020, Response filed Aug. 20, 2015 to Final Office Action dated May 20, 2015", 15 pgs.
"U.S. Appl. No. 14/085,402, Examiner Interview Summary dated Mar. 23, 2015", 3 pgs.
"U.S. Appl. No. 14/085,402, Examiner Interview Summary dated Jun. 13, 2014", 3 pgs.
"U.S. Appl. No. 14/085,402, Final Office Action dated Apr. 6, 2015", 15 pgs.
"U.S. Appl. No. 14/085,402, Final Office Action dated Aug. 1, 2014", 15 pgs.
"U.S. Appl. No. 14/085,402, Non Final Office Action dated Mar. 10, 2014", 15 pgs.
"U.S. Appl. No. 14/085,402, Non Final Office Action dated Nov. 20, 2014", 15 pgs.
"U.S. Appl. No. 14/085,402, Notice of Allowance dated Aug. 26, 2015", 16 pgs.
"U.S. Appl. No. 14/085,402, Preliminary Amendment filed Dec. 7, 2013", 3 pgs.
"U.S. Appl. No. 14/085,402, Response filed Mar. 20, 2015 to Non Final Office Action dated Nov. 20, 2015", 12 pgs.
"U.S. Appl. No. 14/085,402, Response filed Jun. 10, 2014 to Non Final Office Action dated Mar. 10, 2014", 10 pgs.
"U.S. Appl. No. 14/085,402, Response filed Jul. 6, 2015 to Final Office Action dated Apr. 6, 2015", 11 pgs.
"U.S. Appl. No. 14/085,402, Response filed Nov. 3, 2014 to Final Office Action dated Aug. 1, 2014", 12 pgs.
"U.S. Appl. No. 14/565,963, Preliminary Amendment filed Jan. 12, 2015", 9 pgs.
"U.S. Appl. No. 14/967,030, Preliminary Amendment filed Dec. 17, 2015", 8 pgs.
"U.S. Appl. No. 14/565,963, Appeal Brief filed Apr. 14, 2017", 18 pgs.
"U.S. Appl. No. 14/565,963, Notice of Allowance dated Jun. 28, 2017", 9 pgs.
"U.S. Appl. No. 15/486,492, Preliminary Amendment filed Apr. 26, 2017", 7 pgs.

METHODS AND SYSTEMS FOR RECOMMENDING A CONTEXT BASED ON CONTENT INTERACTION

CROSS-REFERENCE TO RELATED APPLICATIONS

This application is a continuation of U.S. application Ser. No. 13/853,020, filed Mar. 28, 2013, which claims priority to U.S. application Ser. No. 13/010,681, filed Jan. 20, 2011, now U.S. Pat. No. 9,172,762, issued Oct. 27, 2015, each of which is incorporated herein by reference in its entirety.

TECHNICAL FIELD

The present disclosure generally relates to processing and presenting web content within an online social networking environment. More specifically, the present disclosure relates to methods and systems for recommending to a user a particular context of potential interest, based on detecting an interaction with some item of web content.

BACKGROUND

A social network service is a computer-or web-based application that enables users to establish links or connections with persons for the purpose of sharing information with one another. In general a social network service enables people to memorialize or acknowledge the relationships that exist in their "offline" (i.e., real-world) lives by establishing a computer-based representation of these same relationships in the "online" world. With a social networking site or service, a user may have many options for sharing information with others. For example, a user may communicate a private message to a single user, for example, by directing an email to the user, or by posting the message to a web page only accessible to the recipient. In addition to sharing user-generated content, a social networking user may share information by sharing a link (e.g., a hyperlink or Uniform Resource Identifier (URI)), directing the recipient to an external content source, such as a blog site, news site, or, an audio or video clip of potential interest to the recipient. In addition to enabling one-to-one sharing, many social network services make it easy to share information with multiple users. For example, some social network services enable a user to post a message to, or share a link with, all users or some predefined set of users, such as a group. With some social networks, users can self-organize into groups, such that like-minded individuals, or individuals with a common interest, can become members of the same group for purposes of sharing information and communicating with one another.

As users of social network services become more accustomed to interacting with and via the services, and as users become accustomed to sharing more personal information using the services, the services have access to greater amounts of more personal user information. Consequently, opportunities exist to improve and enrich the overall experience by presenting to users the right mix of information at the right time.

DESCRIPTION OF THE DRAWINGS

Some embodiments are illustrated by way of example and not limitation in the figures of the accompanying drawings, in which.

DETAILED DESCRIPTION

Figure 1:
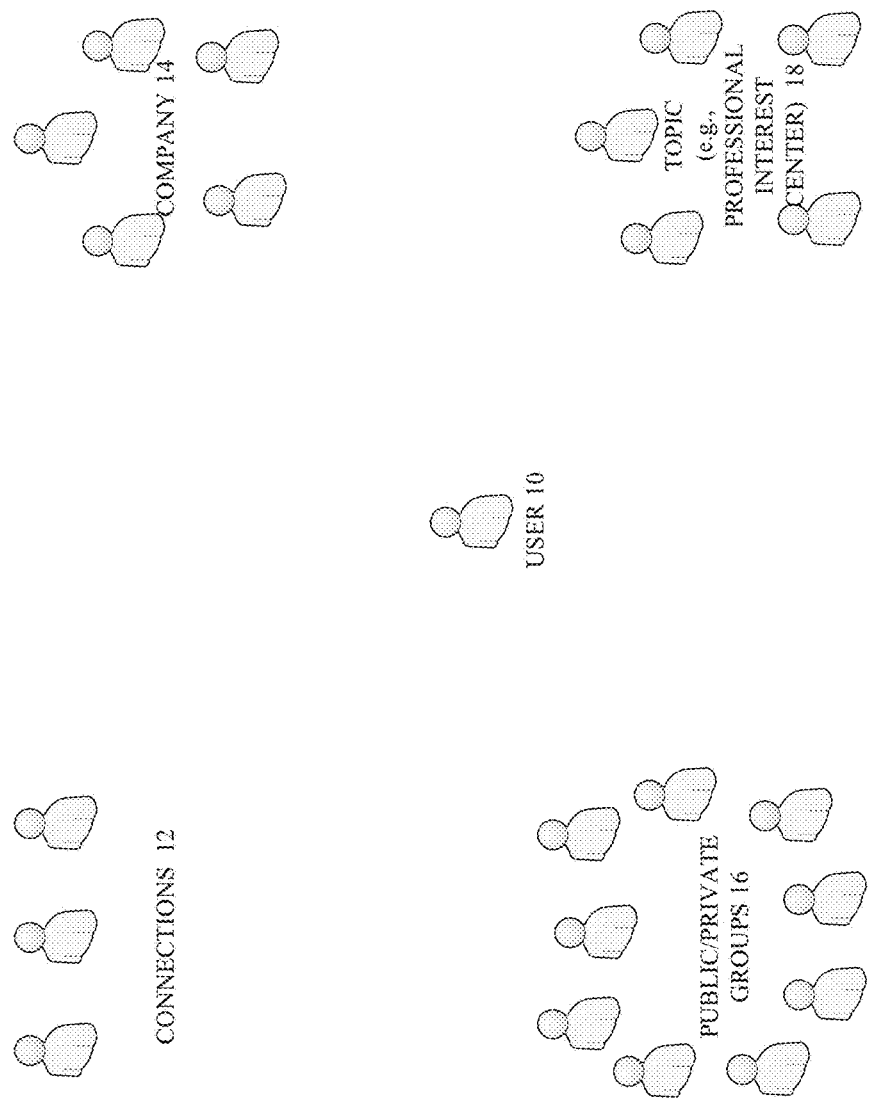
FIG. 1 shows some of the many relationships that an individual user of a social network service may have with other users of the social network service, and illustrates some of the many online forums that may be facilitated and hosted by a social network service, and thus recommended as potential content sources, consistent with some embodiments of the invention.

Methods and systems for recommending to a user a particular context of potential interest, based on detecting an interaction by the user with some item of web content, are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

In addition to enabling users to self organize into personal networks based on common interests and to facilitating communication and the exchange of information between users, some social network services attempt to recommend to users individual items of web content (e.g., news stories) based on some explicit, or implicit, expression of interest by the users. For instance, a social network user may indicate that she is interested in certain topics, for example, by checking a box corresponding with topics of interest, or otherwise indicating or selecting topics of interest. Accordingly, the social network service may recommend that the user view certain content that is deemed to have subject matter consistent with a particular topic. In some instances, rather than recommending content based on an explicit expression of interest, a social network service may recommend content based on some implicit expression of interest. For example, a social network service may detect and analyze content items that a particular user is accessing (e.g., viewing, sharing, and/or submitting), and based on the analysis, recommend other content deemed to be similar to the content being accessed by the user. With some embodiments, asocial network service may detect and analyze interactions with items of content via the social network service, as well as interactions that occur via externally hosted, third-party services or websites.

Consistent with some embodiments of the present invention, a social network service will recommend to a user a particular context as opposed to content) of potential interest to the user, based on detecting an interaction by the user with some item of web content, such as a web document. As used herein, the term context is meant to encompass both online and offline forums, assemblies, events, seminars, webinars, groups, and so forth. By recommending contexts of potential interest to the user, the user is informed of a content source that may be of interest to the user. As such, if the context involves an online content source, the user may choose to subscribe to, or follow, the content source, thereby allowing the user to be periodically and automatically notified about new web content that is related to a particular topic of interest. Similarly, if the context involves an offline content source, such as an event (e.g., conference, seminar, class, etc.), the user may register to attend the one time, or repeating event. Accordingly, not only does recommending a context instead of an item of content provide the advantage of being a potential repetitive content source, the recommended context may lead to the user meeting and interacting with other persons with similar interest.

Consistent with some embodiments, when a user interacts with a particular item of web content, the social network service detects the interaction and determines a topic to which the web content relates. This interaction with the content related to the particular topic is then used as an implicit expression of interest to identify and recommend contexts in which other content related to the same topic is being presented. For instance, after determining that the content with which the user interacted is related to a particular topic, the social network service may recommend that the user join a group that is known to have users that frequently post content related to the topic, or post comments discussing the particular topic. Other aspects of the inventive concepts are described below in connection with the description of the various figures.

FIG. 1 shows some of the many relationships that an individual user 10 of a social network service may have with other users of the social network service, and illustrates some of the many contexts that may be facilitated and hosted by a social network service, and thus recommended as potential content sources, consistent with some embodiments of the invention. For instance, a user 10 may be directly connected with one or more other users, as illustrated by the users labeled as "Connections" in FIG. 1, with reference number 12. With some embodiments, a first-level connection is a person with whom a user has directly connected, whereas a second-level connection is a person connected to the individual user 10 by way of a first-level connection for example, a concept that is frequently referred to as a friend-of-a-friend. Consistent with some embodiments of the invention, the various online and offline forums (e.g., contexts) to which an individual user's connections are associated may weigh in favor of those contexts being recommended to the individual user.

In addition to establishing connections with other users, a social network user may indicate that he is an employee of a particular company, is a former employee of a company, or simply has an interest in a particular company (e.g., by subscribing to "follow" the company). This relationship is indicated in FIG. 1 by the group of users with label, "Company", and reference number 14. This information may be explicitly provided, for example, by the social network service prompting for and receiving employment history information for a user, such that the information forms part of the user's social network profile. Similarly, a user may affirmatively request to become part of an administered group for his company, where the group is hosted by the social network service and serves as an online forum for the exchange of information between all participating employees of the company. A company group is an example of a context that may be recommended to a particular user, consistent with some embodiments of the invention. For example, an individual user may receive a recommendation to join a particular company group as a result of the group members frequently posting information about a particular topic to an online forum only accessible to members of the group, or alternatively, as a result of members of the group frequently discussing a particular topic in the comments of a commenting system for a particular forum.

Another type of relationship a user may have with another user involves common membership in a group. This is illustrated in FIG. 1 by the users labeled "Group" with reference number 16. For instance, a group may be or involve an online forum where users with similar interests can exchange information and engage in discussions about topics of interest that are generally related to the group. Groups may be self-administered, such that any user of the social network service can establish a group, and become the group's administrator. Alternatively, a group may be administered by an operator or administrator of the social network service. A group may be a public group and open to all users of the social network service, or a private group requiring an invitation or a confirmation of some information prior to being granted membership in the group. For example, registration with a group for the alumni of a particular school may require that each user confirm his matriculation with and/or graduation from the particular school prior to being granted access to the alumni group. The social network service may facilitate the exchange of information between group members by allowing group members to post and share content, such as copies of web documents, links to web documents, audio and video information, etc. In addition, a group may have a commenting system that enables members of the group to post comments in connection with individual items of web content. The commenting system may enable threaded discussions, such that users can initiate new discussions (e.g., by posting a comment in association with an item of web content), or reply to the comments posted by others. An online group, whether hosted by the social network service or hosted by some external server, is yet another example of a context that may be recommended to a particular user.

A final type of relationship illustrated in FIG. 1 may involve being related to others who have subscribed to the same topic of interest. For example, with some embodiments, a social network service may allow users to subscribe to content associated with particular topics. For example, these topics may be associated with what are referred to as professional interest centers 18. Consistent with some embodiments, a professional interest center is similar to a group, but is maintained or administered by a select user or group of users who are deemed to be experts on a particular topic. These experts are then responsible for curating (e.g., selecting and/or authoring) the content that is published in connection with their particular professional interest center. A user may subscribe to a particular professional interest center to receive notifications of when new content is published and shared. These professional interest centers are yet another example of a context that may facilitate the exchange of information that may be of interest to a user, and thus may be recommended to an individual user as a result of the user interacting with some item of web content.

In addition to the specific relationship types illustrated in FIG. 1, the relevance to a user of a particular context may be determined based on a variety of other data as well, to include profile data, data derived from analyzing and tracking a user's interactions with the social network service or a third party service, and other data. For instance, with some embodiments, certain keywords used in a user's profile to describe some aspect of his experience, or interests, may be utilized in determining the likelihood that a particular context will be of interest to the user. Similarly, if a user performs a keyword search, this keyword may be used to identify a particular context of potential interest to the user. In addition, such profile information as the industry a user belongs to, or the location where the user lives, may be utilized to assess the likelihood that a certain context will be of interest to the user. If a user has attended a certain event, as evidenced by information obtained via the social network service, or via a third-party data source, such information may be useful in determining the relevance to the user of certain other events, and an on A user's reading history (e.g., which books a user has read, or which articles or document clusters the user tends to read from) may be used to assess the relevance of context for recommendation to the user.

Figure 2:
FIG. 2 illustrates an example of the various interactions that a social network user may have with a web document via a social network service, consistent with some embodiments of the invention.

FIG. 2 illustrates an example of the various interactions that a user may have with a web document, consistent with some embodiments of the invention. For instance, consistent with some embodiments, a user may submit or post a web document to the social network service, view or read a web document via the social network service, and/or share a web document with another user, group, or company. With some embodiments, an activity detection module continuously operates to detect the interactions that each individual user takes with respect to web documents. Accordingly, the detected interactions are recorded, for example, by storing activity data in an appropriate database table. In addition, the web documents are analyzed in real-time to assess the topics to which the web documents relate. For instance, when a user submits or posts a URI, so as to share a web document by publishing the source or location of the web document, the social network service may fetch or retrieve the web document, analyze the text of the web document, and determine or identify a list of topics to which the web document relates. These topics are then utilized to identify one or more contexts (e.g., public or private forums, and so forth) that can be recommended to the user who submitted or posted the web document. Accordingly, a context recommendation may be displayed to a user after the user has submitted a web document (e.g., the URI or URL associated with a web document) to another user or group, via the social networking service. Similarly, a context recommendation may be displayed to a user after the user has shared a web document with another user, or after a user has simply read or viewed a particular web document.

In some embodiments, a social network service environment may extend beyond the immediate reach of the servers on which the social network service is operated to one or more external servers and/or services via one or more implemented application programming interfaces (APIs), Accordingly, at least with some embodiments, the interactions that a user has with web content external to the social network service may be detectable by the social network service. With some embodiments, the particular activities that are monitored and detected are those activities that occur via interactions with the social network service. However, in some embodiments, in addition to interactions that occur via the social network, other interactions that occur outside of the social network system are also analyzed. For instance, the social network service may have access to data that is generated by one or more third-party services, such that the data may be accessed periodically, or in real-time, via an application programming interface (API). In some instances, a formal agreement will be in place between the social network service and the third party, such that the third party will have previously agreed to share data with the social network service. In other instances, the social network service may have one or more automated processes for "scraping" data from a third-party service. In any case, some embodiments utilize both data derived from internally detecting certain interactions, as well as data derived from external data sources, where such data is used to assess the likelihood that a user will be interested in a certain cluster of articles, associated with certain topics.

Figure 3:
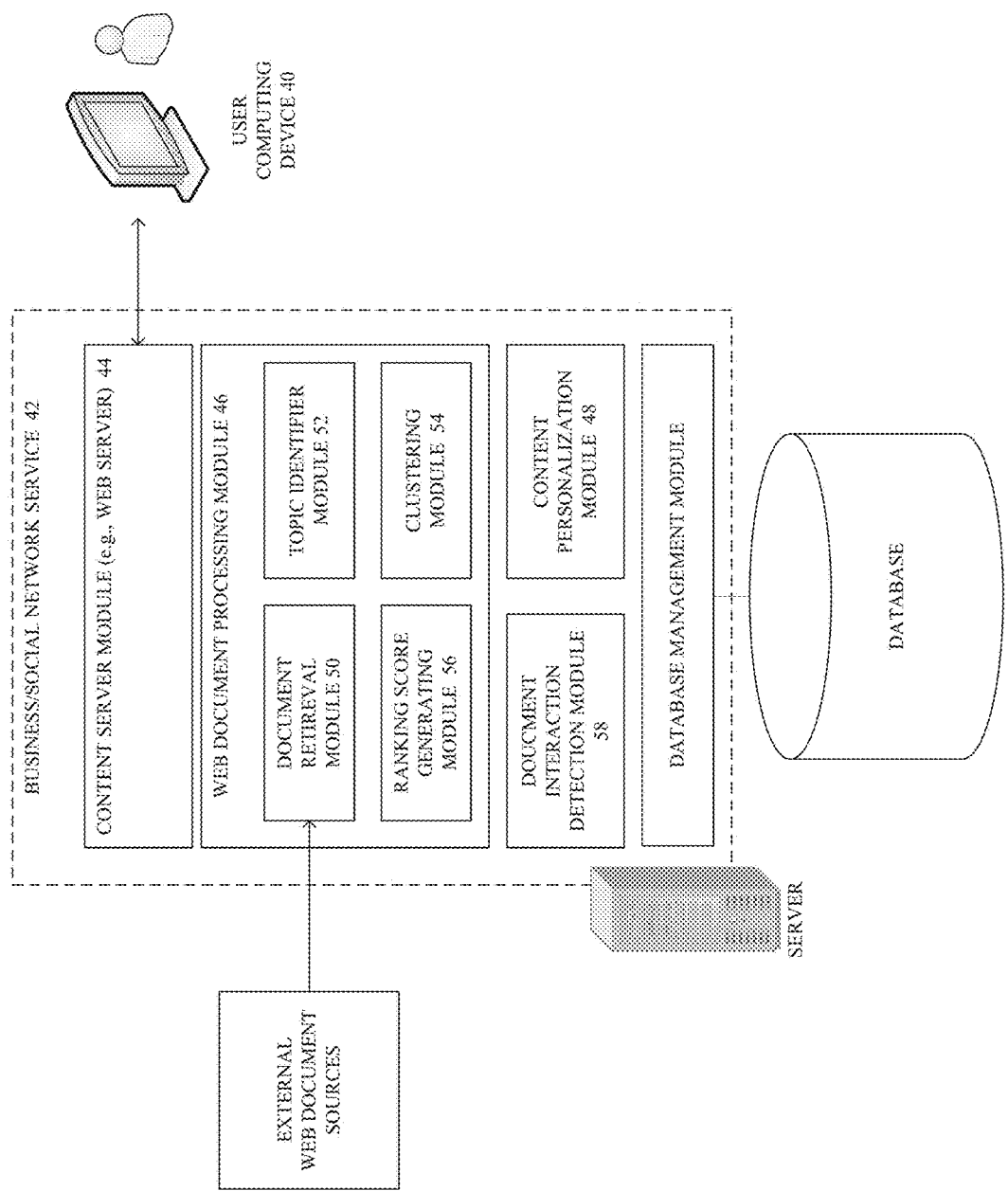
FIG. 3 illustrates a functional block diagram of some of the various processor-implemented modules for use in carrying out sonic of the methodologies described herein, consistent with some embodiments of the invention.

FIG. 3 illustrates a functional block diagram of some of the various software and/or hardware modules for use in carrying out some of the methodologies described herein, consistent with some embodiments of the invention. As described in greater detail below, the various modules shown in FIG. 3 represent collections of executable software instructions, which, when executed by a processor, facilitate various functions or operations. As such, at least with some embodiments, the modules represent processor-implemented modules for carrying out the various methodologies described herein.

Consistent with some embodiments of the invention, a user utilizes a computing device 40 to access the social network service 42 over a data network, such as the Internet. As such, the social network service 42 includes a content server module (e.g., a web server) 44 for receiving and processing requests for content. The content server module 44 operates in conjunction with a web document processing module 46 and a content personalization module 48 to present a user with context recommendations, based on the detection of an interaction with a web document. More specifically, the content personalization module 48 facilitates the presentation to a user of recommendations regarding content sources, such as online or offline forums, events, etc., that the user is likely to find of interest, based on an analysis of how the user, and persons with whom the user is related, have interacted with various web documents.

The web document processing module 46 includes a document retrieval module 50, a topic identifier module 52, a clustering module 54 and a ranking score generating module 56. With some embodiments, the document retrieval module 50 may automatically request and receive web documents from one or more external services e.g., content partners. Additionally, the document retrieval module 50 may fetch or retrieve documents in real time as those documents are submitted to the social network service by users. For instance, when a user shares or posts a URI of a particular web document via the social network service, the document retrieval module 50 may request the web document from a content source by its URI. Regardless of how received, the web document processing module 46 includes a topic identifier module 52 and a clustering module 54 that process documents when received. Consistent with some embodiments, the topic identifier module 52 processes received web documents to identify topics with which the web document might be related, and to identify contexts that are associated with certain topics. Any number of known algorithms for identifying topics in textual content may be utilized. For example, the topic identifier module 52 may analyze the text of the web document and form topic vectors based on the words found within the text. With some embodiments, the result of the analysis is a set of topics, and a confidence number assigned to each web document indicating a measure of the confidence that the particular web document relates to a particular topic. By identifying the topics to which a document relates, the various online groups known to discuss certain topics can be identified. A similar analysis may be undertaken for other types of web content, such as the user postings and user comments that are facilitated by the social network service. In this way, the postings and comments can he analyzed to determine the topics to which they relate, and thus allowing the various hosted forums to be assigned topics to which they relate.

With some embodiments, the clustering module 54 processes web documents to generate clusters of web documents, where topics identified by the topic identifier module 52 form the basis of each cluster. For instance, the clusters of web documents may be automatically generated, after topics are automatically selected to be the basis of the individual clusters. For instance, atopic may be a particular news event, such as, the inauguration of the U.S. President. The document clustering module 54 will then analyze the text of each web document to assess whether the web document is about the particular topic associated with the various clusters. In some instances, the various topics which form the basis of each cluster may be automatically suggested and then manually selected. However, in some embodiments, the entire process is automated.

Consistent with some embodiments of the invention, a document interaction detection module 58 detects interactions with web documents. For instance, each time a user of the social network takes any one of the actions specified and described in connection with FIG. 2, the interaction is detected and the appropriate database tables are updated to reflect the interaction. Moreover, after an interaction with a particular web document has been identified, the topics to which the web document relates are identified. Using these topics, the content personalization module identifies one or more contexts that are known to be associated with one or more of the same topics to which the web document relates. For example, if a user posts a web document relating to a particular sports team (e.g., topic=New York Yankees), the content personalization module may identify one or more online groups hosted by the social network service, such that the one or more groups are known to be associated with online discussions related to the topic, the New York Yankees. In some instances, the contexts that may be recommended to a user may be hosted by the social network service, but in other instances, a context may be externally hosted (e.g., by another server) or even an off-line (e.g., real-world) event.

Figure 4:
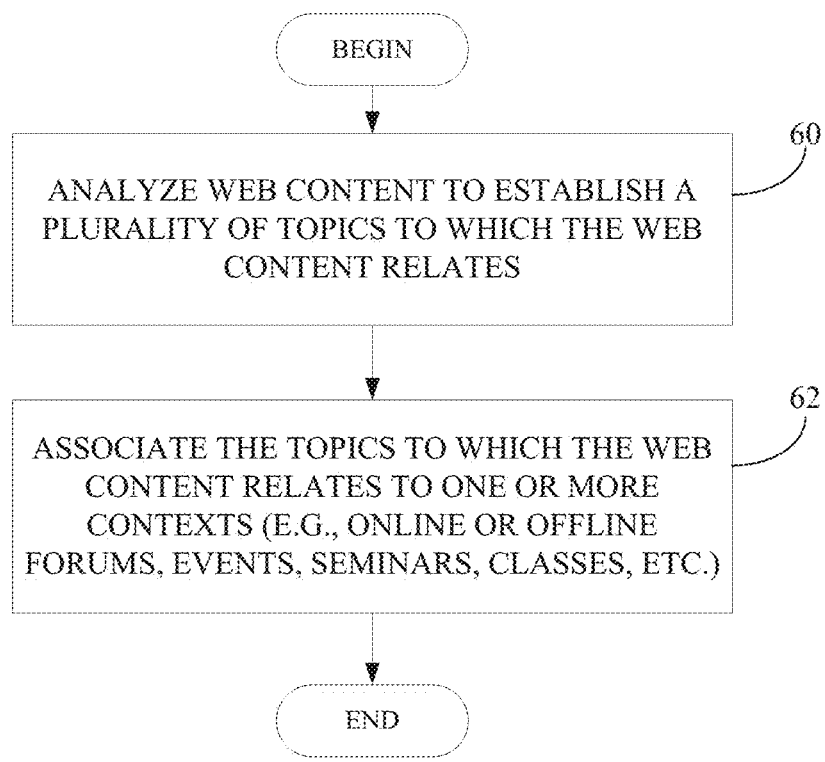
FIG. 4 illustrates a method, consistent with some embodiments of the invention, for identifying topics to which certain web content relates, and contexts (e.g., online forums) that have content related to topics.

FIG. 4 illustrates a method, consistent with some embodiments of the invention, for identifying topics to which certain web content relates, and contexts (e.g., online and offline forums, etc.) that have, or are associated with, content related to the identified or generated topics. For example, the method begins at method operation 60 when web content is analyzed to establish a plurality of topics to which the web content relates. In some instance, the analysis involves analyzing the text of the content to identify the topics. In some instances, the web content may be web documents, comments from a commenting system, user postings to the social network service, and so forth. The web content may be hosted via the social network service or externally hosted, for example, by a remote server. In some instances, the web content may be web documents provided to the social network service by an external source, such as a source of news-related content. In other instances, the web content may be content generated via the social network service, for example, as users post and share information with one another, and within the context of the various hosted groups to which the users belong. Once the topics to which the web content relates have been identified or established, the topics are associated with the various contexts from which the web content was received. For instance, if a web document was posted in a particular group, a topic to which the web document is related will be assigned to the group. By way of example, if several members of a group (e.g., an Information Technology Enthusiasts Group) are posting comments related to the topic, tablet computers, then the group will be associated with a topic, tablet computers.

In some embodiments, the associations that are identified as result of the textual analysis of the web content are memorialized in various database tables. As such, each item of web content may have a content identifier, and each topic identified may have its own topic identifier Similarly, each unique context from which the web content was received, or is associated, may have a unique identifier, such as a context identifier, forum identifier, or event identifier. The various identifiers are then stored in database tables in a manner to indicate their relative associations.

Figure 5:
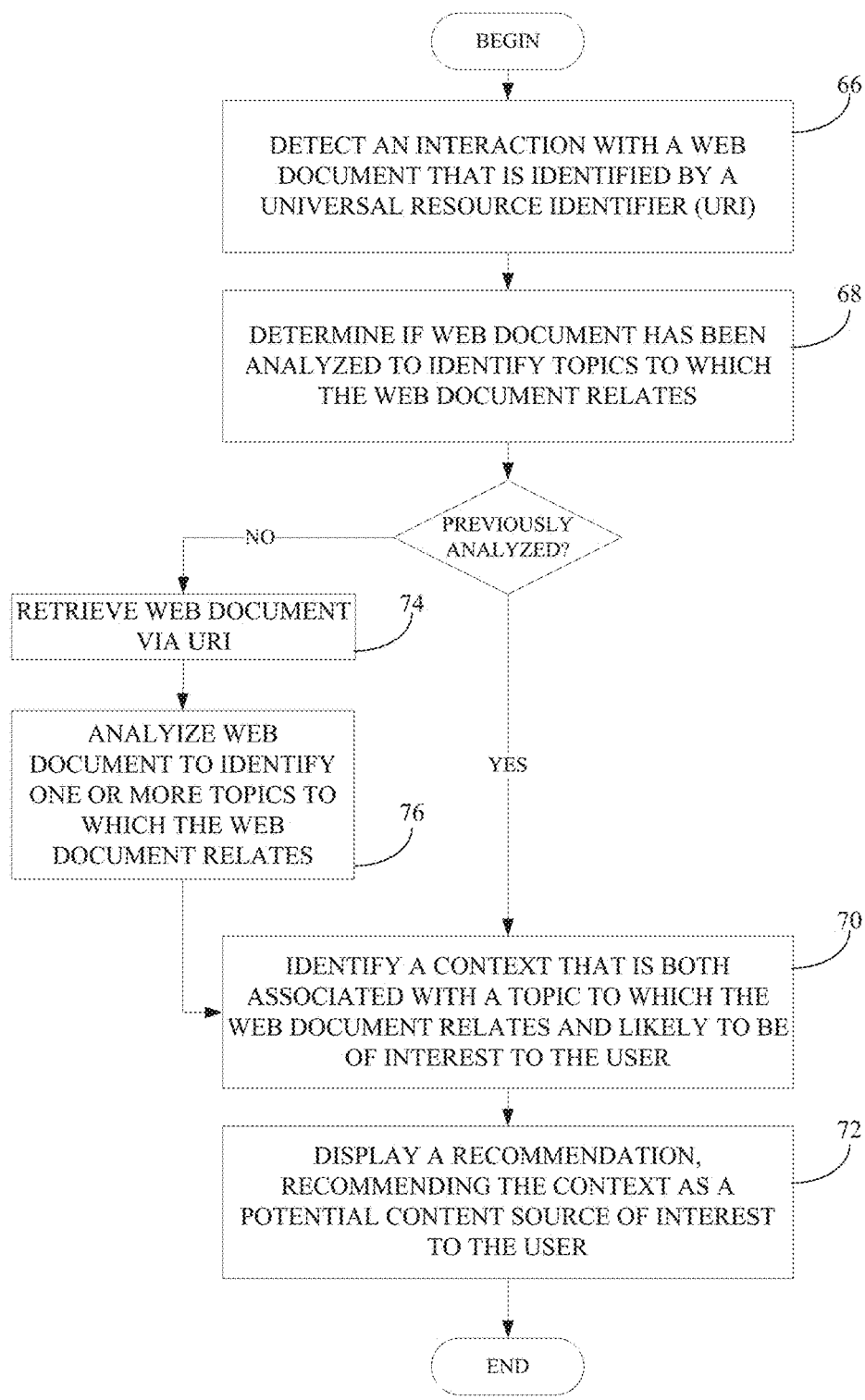
FIG. 5 illustrates a method, consistent with some embodiments of the invention, for recommending a context (e.g., a forum) that a user may find of interest, based on the detection of an interaction, by the user, with a web document that is determined to be associated with a topic that is also associated with the context.

FIG. 5 illustrates a method, consistent with some embodiments of invention, for recommending a context (e.g., a forum) that a user may find of interest, based on the detection of an interaction, by the user, with a web document that is determined to be associated with a topic that is also associated with the recommended context. The method begins at method operation 66 when the social network service detects an interaction with a web document that is associated with, or identified by, a Uniform Resource identifier (URI). The interaction may be any of those listed and described in connection with FIG. 2. For example, a user may interact with a web document by posting the URI of the web document via the social network service, for the purpose of sharing the web document with a user, a group, a company, and so forth. Similarly, a user may simply select a link to a web document for the purpose of viewing or reading the content associated with the link, After detecting the web document interaction, at method operation 68 the social network service determines if the web document has been previously analyzed to identify the topics to which the web document relates. For example, with some embodiments, after analyzing a particular web document, the URI of the web document may be cached or stored in a database along with a time stamp indicating the day and/or time when the web document was last analyzed. Accordingly, if the web document has been recently analyzed (as indicated by the time stamp), the topics to which the web document relates will be stored in an appropriate database table. In such a scenario, at method operation 70 the social network service will identify a context that is both associated with a topic to which the web document relates and is likely to be of interest to the user. Because the various contexts have been previously associated with various topics (for example, as described in FIG. 4), identifying a context known to be associated with a particular topic is achieved by performing a database lookup operation. When more than one context is associated with a topic to which the web document relates, then the particular context that is recommended to the user may be selected based in part on an analysis of the prior activities of the user, and/or the prior activities of the persons to whom the user has a relationship with, as defined by the social network service. In such an instance, the prior activities are used as a proxy to assess the likelihood that a user would be interested in content to which those activities were directed. For instance, if a user's direct connections are known to frequently interact in a particular group hosted by the social network service, then that group may be recommended as a context having or involving a content source of potential interest to the user. Finally, at method operation 72 the social network service will display a recommendation to the user, recommending a context as a potential content source of interest to the user.

If the web document with which the user interacts (e.g., at method operation 68) has not previously been received and analyzed at the social network service, then at method operation 74 the web document is retrieved via the web document's associated URI. After receiving the web document, the social network service analyzes the web document at method operation 76 to identify one or more topics to which the web document relates. Once the topics are known, at method operation 70 a context is selected, and at method operation 72 the context is recommended to the user as a potential content source of interest.

Figure 6:
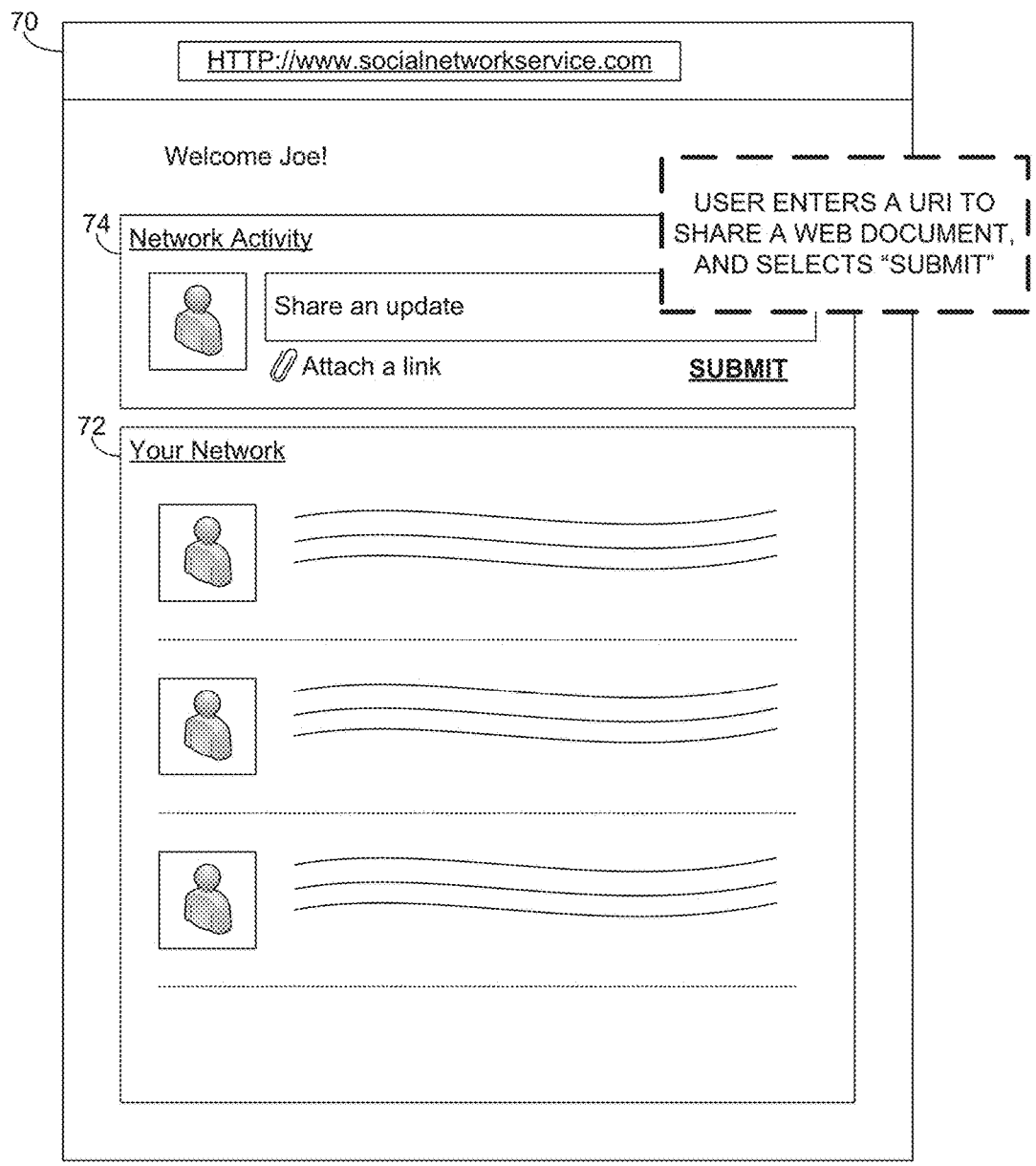
FIGS. 6 and 7 illustrate an example of a user interface via which an interaction with a web document is detected, and a particular context is recommended to a user.
Figure 7:
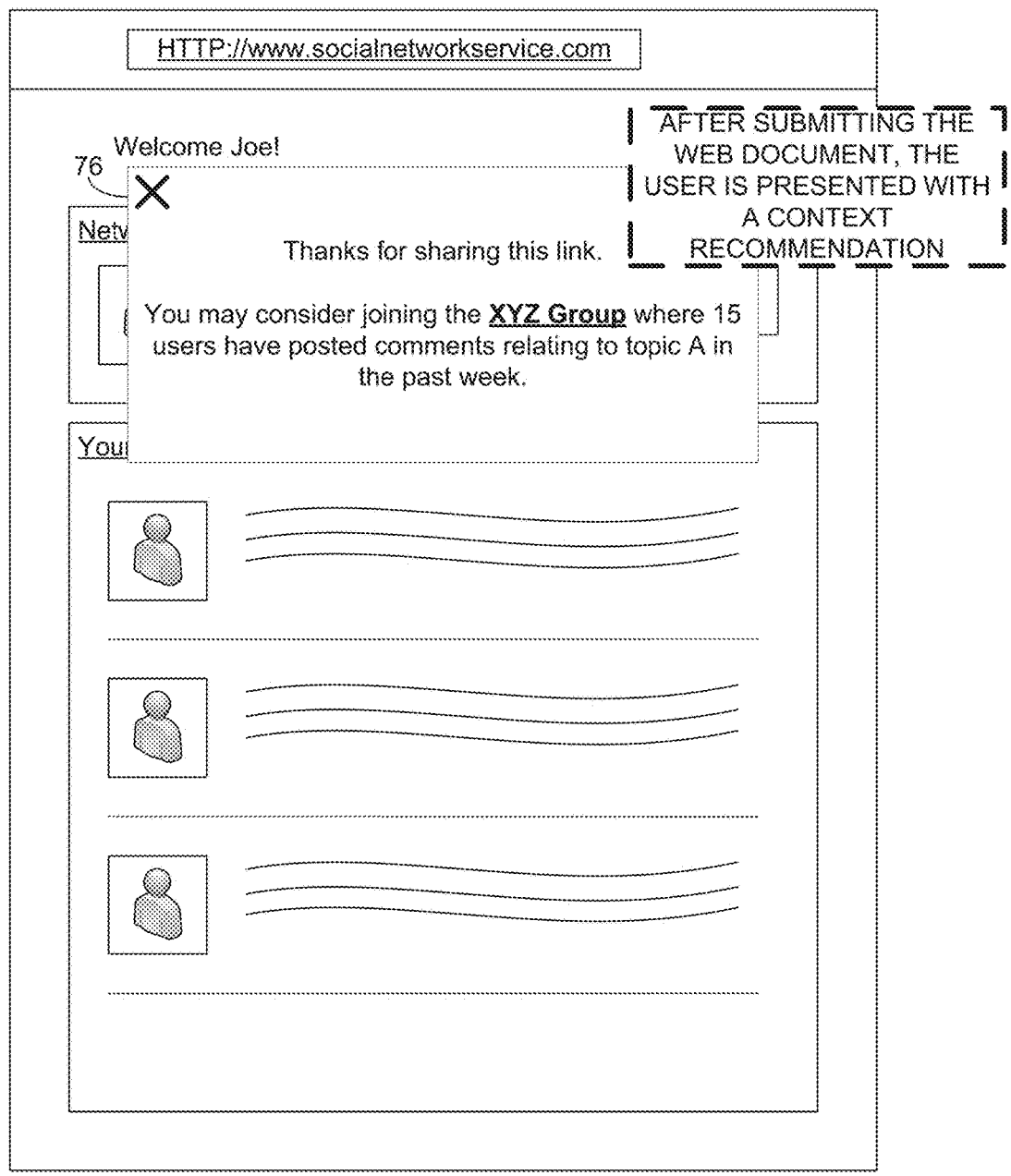

FIGS. 6 and 7 illustrate an example of a user interface via which an interaction with a web document is detected, and a particular context is recommended to a user, consistent with some embodiments of the invention. For instance, in FIG. 6, an example user interface 70 is presented. Within the example user interface 70, a content module 72 showing various network status updates from persons within a user's social network are presented. In addition, the user is presented with a content module 74 that enables the user to enter a network status update to be posted to the social network service and shared with the user's network. In this case, the content module 74 includes a text box where text can be input, a button or link to facilitate the inclusion of an attachment (e.g., a picture, document, or some other file), and a button or link labeled as "SUBMIT" for submitting the post. Accordingly, the user interface enables a user to enter a URI of a web document that the user would like to share with his or her network.

Upon selecting the "SUBMIT" button or link, the user's submission is posted to the social network service, and the user is presented with a second user interface, such as that illustrated in FIG. 7. For example, after submitting a link or URI for a particular web document relating to topic A, the user is presented with a pop-up window 76 that recommends to the user the group, "XYZ Group", which is known to have users posting comments about topic A. In some embodiments, a single recommendation will be presented, while in other embodiments, multiple context recommendations may be presented. Similarly, with some embodiments, some additional detail explaining the reasoning for why the recommendation is being made, may be presented, while in other embodiments, no such explanation may be provided.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 8:
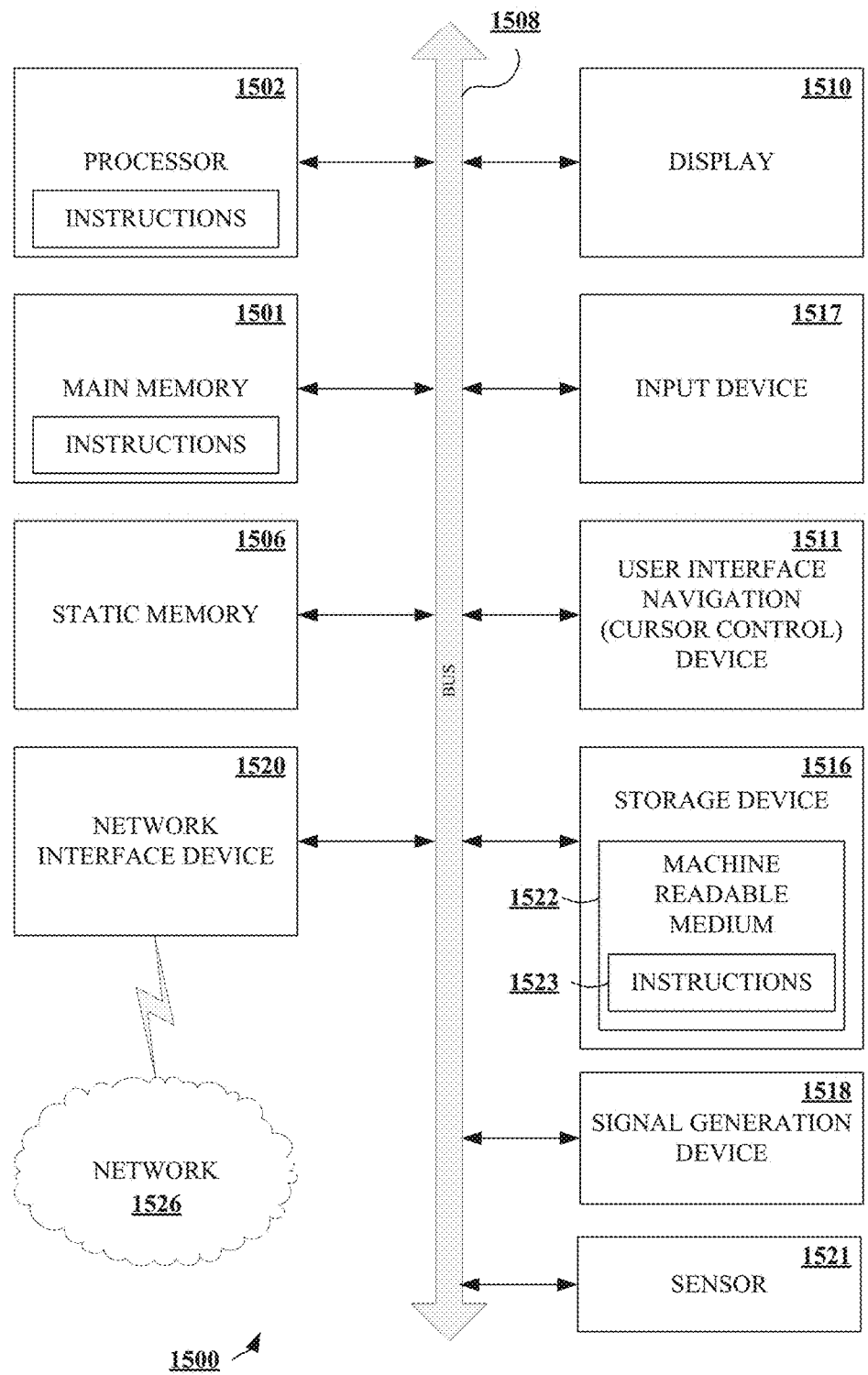
FIG. 8 is a block diagram of a machine in the form of a computer within which a set of instructions, for causing the machine to perform any one or more of the methodologies discussed herein, may be executed.

FIG. 8 is a block diagram of a machine in the form of a computer within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution b the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
    a memory comprising a set of instructions;
    one or more processors coupled to the memory and configured to, at least, based on the set of instructions, perform operations for generating a user interface element for performing an additional action pertaining to a recommendation of a context presented in a user interface of a computer system of a member of a plurality of members of an online computerized social networking system, the operations comprising:
    storing a plurality of content items in a database of the online computerized social networking system, the plurality of content items generated by the plurality of members of the online computerized social networking system;
    detecting a plurality of interactions initiated by the member of the plurality of members with respect to the plurality of content items;
    determining a topic of interest of the member based on the detecting of the plurality of interactions and based on a similarity between a plurality of subjects of a plurality of topics of interest corresponding to the plurality of content items; and
    based on a detecting of an action by the member pertaining to the topic of interest, automatically generating the notification for presentation in the user interface of the computer system of the member, the notification including a recommendation of a context pertaining to the topic of interest of the member, the notification identifying a relationship between the topic of interest and a subset of the plurality of content items stored in the database of the online computerized social networking system, the user interface including the user interface element for performing the additional action.

2. The system of claim 1, wherein the one or more processors are further configured to, based on the set of instructions, select the context from a plurality of contexts based on a relevance of the context to the member in comparison to a relevance of an additional context of the plurality of contexts to the member.

3. The system of claim 2, wherein the selecting the context from the plurality of contexts is further based on information specified by the member in a profile of the member.

4. The system of claim 2, wherein the selecting the context from the plurality of contexts is further based on tracking of behavior of a plurality of connections of the member with respect to the social networking system.

5. The system of claim 2, wherein the selecting of the context from the plurality of contexts is further based on a plurality of interactions of connections of the member with respect to the topic.

6. The system of claim 1, wherein the topic relates to a person and at least one of the plurality of content items is included on a profile page associated with the person.

7. The system of claim 1, wherein the topic of interest relates to activity by the plurality of members with respect to a private group and the notification includes information pertaining to the private group.

8. A method comprising:
    performing operations for generating a user interface element for performing an additional action pertaining to a recommendation of a context presented in a user interface of a computer system of a member of a plurality of members of an online computerized social networking system, the operations comprising:
    storing a plurality of content items in a database of the online computerized social networking system, the plurality of content items generated by the plurality of members of the online computerized social networking system;
    detecting a plurality of interactions initiated by the member of the plurality of members with respect to the plurality of content items;
    determining a topic of interest of the member based on the detecting of the plurality of interactions and based on a similarity between a plurality of subjects of a plurality of topics of interest corresponding to the plurality of content items; and
    based on a detecting of an action by the member pertaining to the topic of interest, automatically generating a notification for presentation in the user interface of the computer system of the member, the notification including a recommendation of a context pertaining to the topic of interest of the member, the notification identifying a relationship between the topic of interest and a subset of the plurality of content items stored in the database of the online computerized social networking system, the user interface including the user interface element for performing the additional action.

9. The method of claim 8, further comprising selecting the context from a plurality of contexts based on a relevance of the context to the member in comparison to a relevance of an additional context of the plurality of contexts to the member.

10. The method of claim 9, wherein the selecting the context from the plurality of contexts is further based on information on specified by the member in a profile of the member.

11. The method of claim 9, wherein the selecting the context from the plurality of contexts is further based on tracking of behavior of a plurality of connections of the member with respect to the social networking system.

12. The method of claim 9, wherein the selecting of the context from the plurality of contexts is further based on a plurality of interactions of connections of the member with respect to the topic.

13. The method of claim 8, wherein the topic relates to a person and at least one of the plurality of content items is included on a profile page associated with the person.

14. The method of claim 8, wherein the topic of interest relates to activity by the plurality of members with respect to a private group and the notification includes information pertaining to the private group.

15. A non-transitory machine-readable medium embodying a set of instructions that, when executed by a processor, cause the processor to perform operations generating a user interface element for performing an additional action pertaining to a recommendation of a context presented in a user interface of a computer system of a member of a plurality of members of an online computerized social networking system, the operations comprising:

storing a plurality of content items in a database of the online computerized social networking system, the plurality of content items generated by the plurality of members of the online computerized social networking system;

detecting a plurality of interactions initiated by a member of the plurality of members with respect to the plurality of content items;

determining a topic of interest of the member based on the detecting of the plurality of interactions and based on a similarity between a plurality of subjects of a plurality of topics of interest corresponding to the plurality of content items; and based on a detecting of an action by the member pertaining to the topic of interest, automatically generating a notification for presentation in the user interface of the computer system of the member, the notification including a recommendation of a context pertaining to the topic of interest of the member, the notification identifying a relationship between the topic of interest and a subset of the plurality of content items stored in the database of the online computerized social networking system, the user interface including the user interface element for performing the additional action.

16. The non-transitory machine-readable medium of claim 15, further comprising selecting the context from a plurality of contexts based on a relevance of the context to the member in comparison to a relevance of an additional context of the plurality of contexts to the member.

17. The non-transitory machine-readable medium of claim 16, wherein the selecting the context from the plurality of contexts is further based on information specified by the member in a profile of the member.

18. The non-transitory machine-readable medium of claim 16, wherein the selecting the context from the plurality of contexts is further based on tracking of behavior of a plurality of connections of the member with respect to the social networking system.

19. The non-transitory machine-readable medium of claim 16, wherein the selecting of the context from the plurality of contexts is further based on a plurality of interactions of connections of the member with respect to the topic.

* * * * *

UNITED STATES PATENT AND TRADEMARK OFFICE
CERTIFICATE OF CORRECTION

PATENT NO. : 10,311,365 B2
APPLICATION NO. : 15/005963
DATED : June 4, 2019
INVENTOR(S) : Ruffner et al.

Page 1 of 1

It is certified that error appears in the above-identified patent and that said Letters Patent is hereby corrected as shown below:

In the Claims

In Column 13, Line 13, in Claim 10, after "information", delete "on"

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*